United States Patent
Lee et al.

(10) Patent No.: US 10,157,076 B2
(45) Date of Patent: Dec. 18, 2018

(54) VIRTUAL MACHINE MIGRATION DEVICE AND METHOD

(71) Applicant: NANNING FUGUI PRECISION INDUSTRIAL CO., LTD., Nanning (CN)

(72) Inventors: Che-Yi Lee, New Taipei (TW); Haw-Jiun Tsan, New Taipei (TW); Chih-Chin Chang, New Taipei (TW)

(73) Assignee: NANNING FUGUI PRECISION INDUSTRIAL CO., LTD., Nanning (CN)

( * ) Notice: Subject to any disclaimer, the term of this patent is extended or adjusted under 35 U.S.C. 154(b) by 0 days.

(21) Appl. No.: 15/391,802

(22) Filed: Dec. 27, 2016

(65) Prior Publication Data

US 2018/0181422 A1    Jun. 28, 2018

(51) Int. Cl.
| | |
|---|---|
| *G06F 9/455* | (2018.01) |
| *H04L 12/26* | (2006.01) |
| *H04L 12/911* | (2013.01) |
| *H04L 12/751* | (2013.01) |
| *H04L 12/733* | (2013.01) |

(52) U.S. Cl.
CPC ...... *G06F 9/45558* (2013.01); *H04L 43/0876* (2013.01); *H04L 45/02* (2013.01); *H04L 45/122* (2013.01); *H04L 47/82* (2013.01); *G06F 2009/4557* (2013.01); *G06F 2009/45595* (2013.01)

(58) Field of Classification Search
CPC .................................................. G06F 9/45533
USPC ............................................................. 718/1
See application file for complete search history.

(56) References Cited

U.S. PATENT DOCUMENTS

| | | | | |
|---|---|---|---|---|
| 9,015,715 | B2* | 4/2015 | Dow ................... | G06F 9/45558 709/223 |
| 9,336,042 | B1* | 5/2016 | Brenneman ......... | H04L 41/0813 |
| 2009/0225234 | A1 | 9/2009 | Ward et al. | |
| 2011/0145380 | A1* | 6/2011 | Glikson ................ | G06F 9/4856 709/223 |

(Continued)

OTHER PUBLICATIONS

Minlan Yu,Yung Yi,Jennifer Rexford,Mung Chiang,A Rethinking Virtual Network Embedding: Substrate Support for Path Splitting and Migration,the ACM SIGCOMM Computer Communication Review,vol. 38 Issue 2, Apr. 1, 2008, pp. 17-29,Princeton University Princeton,USA.

*Primary Examiner* — Mehran Kamran
(74) *Attorney, Agent, or Firm* — ScienBiziP, P.C.

(57) ABSTRACT

A virtual machine (VM) migration device can migrate a VM from a source location to a target location along a migration path calculated to not exceed a predetermined time limit. The migration device includes a first obtaining module, a second obtaining module, a calculation module, and a migration module. The first obtaining module obtains VM migration information and the second obtaining module obtains network status information. The calculation module calculates a migration path according to the network status information and the migration information, taking account of transmission and other delays between intermediate nodes along possible paths. The migration module migrates the VM from the source location to the target location according to the calculated migration path. A VM migration method is also provided.

10 Claims, 5 Drawing Sheets

(56) References Cited

U.S. PATENT DOCUMENTS

| | | | |
|---|---|---|---|
| 2012/0137285 A1* | 5/2012 | Glikson | G06F 9/4856 718/1 |
| 2013/0254403 A1* | 9/2013 | Taniguchi | H04L 47/783 709/226 |
| 2014/0115162 A1* | 4/2014 | Kalyanaraman | H04L 29/08954 709/226 |
| 2014/0115164 A1* | 4/2014 | Kalyanaraman | H04L 29/08954 709/226 |
| 2014/0157269 A1* | 6/2014 | Dow | G06F 9/45558 718/1 |
| 2015/0149687 A1* | 5/2015 | Tsirkin | G06F 12/109 711/6 |
| 2016/0119417 A1* | 4/2016 | Fang | H04L 67/1095 709/219 |
| 2017/0147380 A1* | 5/2017 | Brenneman | G06F 9/45558 |

* cited by examiner

VIRTUAL MACHINE MIGRATION DEVICE AND METHOD

FIELD

The subject matter herein generally relates to a device and method for migrating one or more virtual machines.

BACKGROUND

Live migration refers to a process of moving a virtual machine or application which is running between different physical machines without disconnecting from a client. When a user moves a virtual machine between physical machines, a migration path of the virtual machine may comprises multiple intermediate nodes.

BRIEF DESCRIPTION OF THE DRAWINGS

Implementations of the present technology will now be described, by way of example only, with reference to the attached figures.

DETAILED DESCRIPTION

Figure 1:
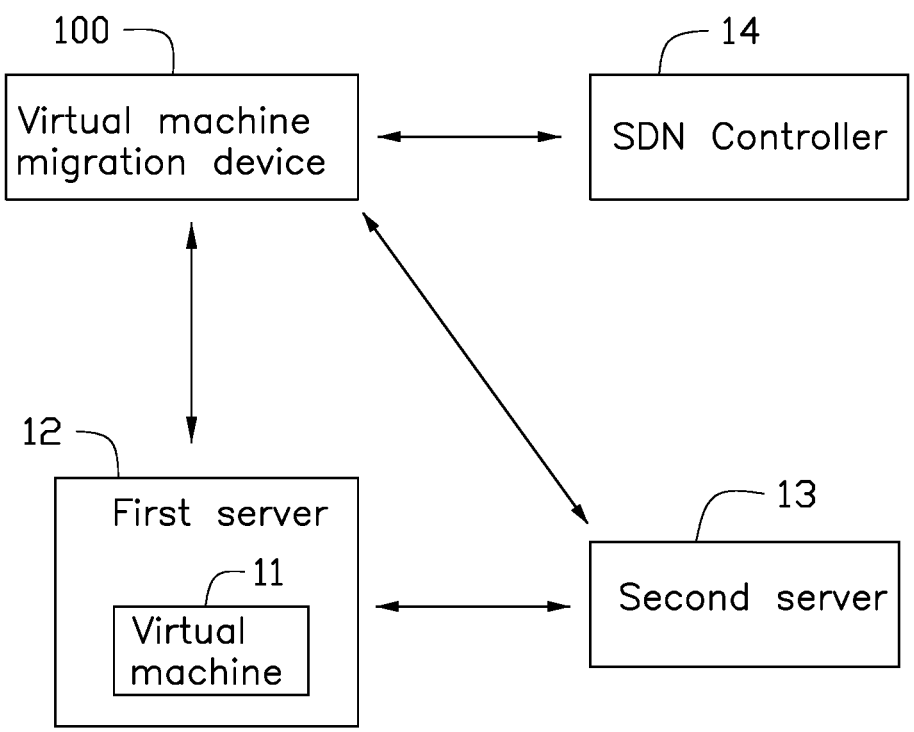
FIG. 1 is a diagram of an exemplary embodiment of a virtual machine migration device.

It will be appreciated that for simplicity and clarity of illustration, where appropriate, reference numerals have been repeated among the different figures to indicate corresponding or analogous elements. In addition, numerous specific details are set forth in order to provide a thorough understanding of the exemplary embodiments described herein. However, it will be understood by those of ordinary skill in the art that the exemplary embodiments described herein can be practiced without these specific details. In other instances, methods, procedures, and components have not been described in detail so as not to obscure the related relevant feature being described. Also, the description is not to be considered as limiting the scope of the exemplary embodiments described herein. The drawings are not necessarily to scale and the proportions of certain parts may be exaggerated to better illustrate details and features of the present disclosure. It should be noted that references to "an" or "one" exemplary embodiment in this disclosure are not necessarily to the same exemplary embodiment, and such references mean "at least one."

Several definitions that apply throughout this disclosure will now be presented.

The term "coupled" is defined as connected, whether directly or indirectly through intervening components, and is not necessarily limited to physical connections. The connection can be such that the objects are permanently connected or releasably connected. The term "comprising," when utilized, means "including, but not necessarily limited to"; it specifically indicates open-ended inclusion or membership in the so-described combination, group, series, and the like.

FIG. 1 illustrates a virtual machine migration device 100. The virtual machine migration device 100 is configured to migrate a virtual machine 11 from a source location to a target location.

In one exemplary embodiment, the source location is a first server 12, and the target location is a second server 13 different from the first server. The virtual machine 11 is migrated from the first server 12 to the second server 13. The first server 12 and the second server 13 can be in different locations. The first server 12 can communicate with the second server 13 through a network.

Figure 2:
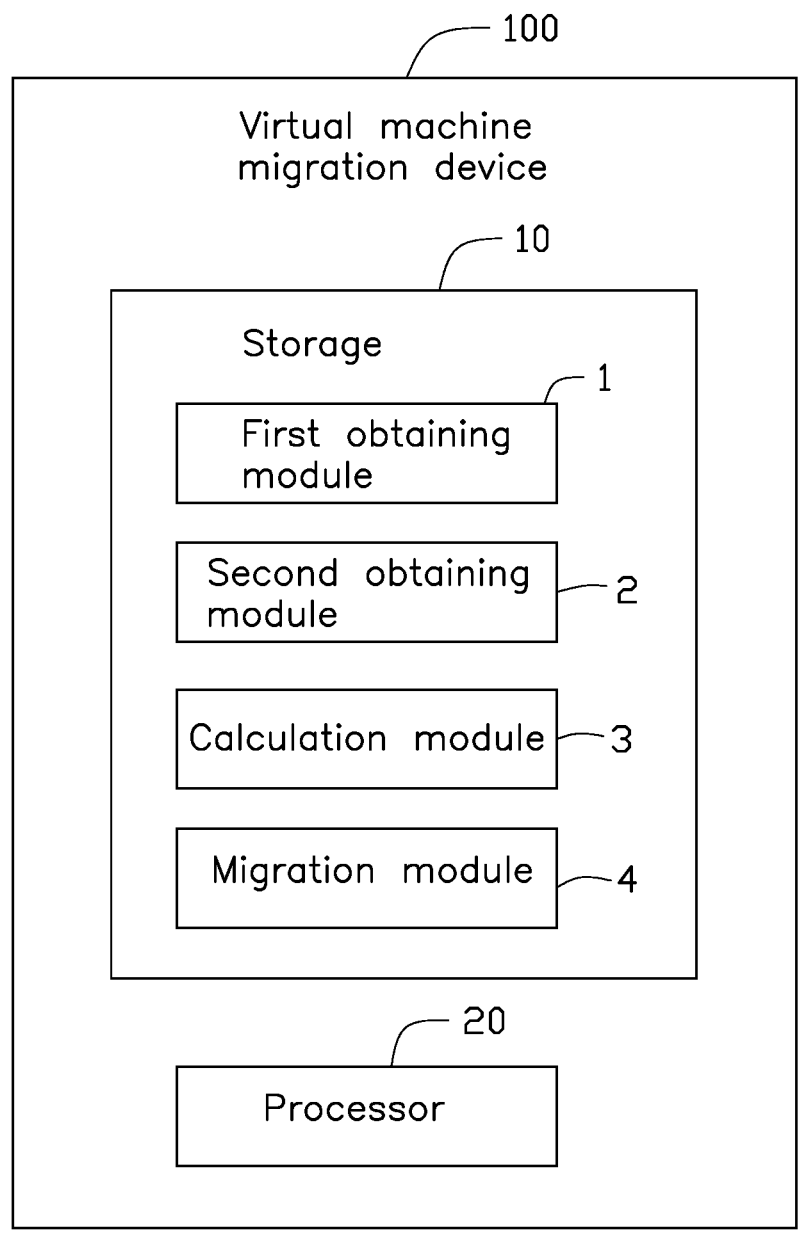
FIG. 2 is a block diagram of an exemplary embodiment of a virtual machine migration device.

Referring to FIG. 2, the virtual machine migration device 100 can comprise at least one storage 10 and at least one processor 20. The virtual machine migration device 100 can further include a plurality of modules, such as a first obtaining module 1, a second obtaining module 2, a calculation module 3, and a migration module 4. The modules 1-4 can include one or more software programs in the form of computerized codes stored in the storage 10. The computerized codes can include instructions that can be executed by the processor 20 to provide functions for the modules 1-4.

The first obtaining module 1 is configured to obtain migration information of the virtual machine 11. The migration information can comprise first server information, second server information, and a service timeout time.

In one exemplary embodiment, the service timeout time is configured to keep all processes running without noticeable application downtime and will not disconnect from a client. The service timeout time can be 15 seconds. When the virtual machine 11 is being migrated, a migration time of the virtual machine 11 must be less than 15 seconds.

The second obtaining module 2 is configured to obtain network status information. The second obtaining module 2 can communicate with a software defined network (SDN) controller 14 to obtain the network status information.

The calculation module 3 is configured to calculate a migration path according to the network status information and the migration information. The migration module is configured to migrate the virtual machine 11 from the first server 12 to the second server 13 according to the migration path calculated by the calculation module 3.

When the virtual machine migration device 100 migrates one or more virtual machines, the virtual machine migration device 100 obtains priority between the virtual machines, and migrates each of the virtual machines according to the priority.

In one exemplary embodiment, the second obtaining module 2 is further configured to determine whether the network status information is changed. When the network status information is changed, the calculation module 3 is further configured to recalculate the migration path, and the migration module 4 is further configured to migrate the virtual machine 11 to the second server 13 according to the recalculated migration path.

In one exemplary embodiment, the calculation module 3 is further configured to establish a network topology according to the network status information and the migration information, and simplify the network topology according to the service timeout time. The calculation module 3 obtains one or more feasible migration paths according to a simplified network topology and calculates a number of intermediate nodes of each of the feasible migration paths according to a minimum hop path algorithm. Then, the calculation module 3 can select a feasible migration path with minimum intermediate nodes as the migration path to migrate the virtual machine 11.

Figure 3:
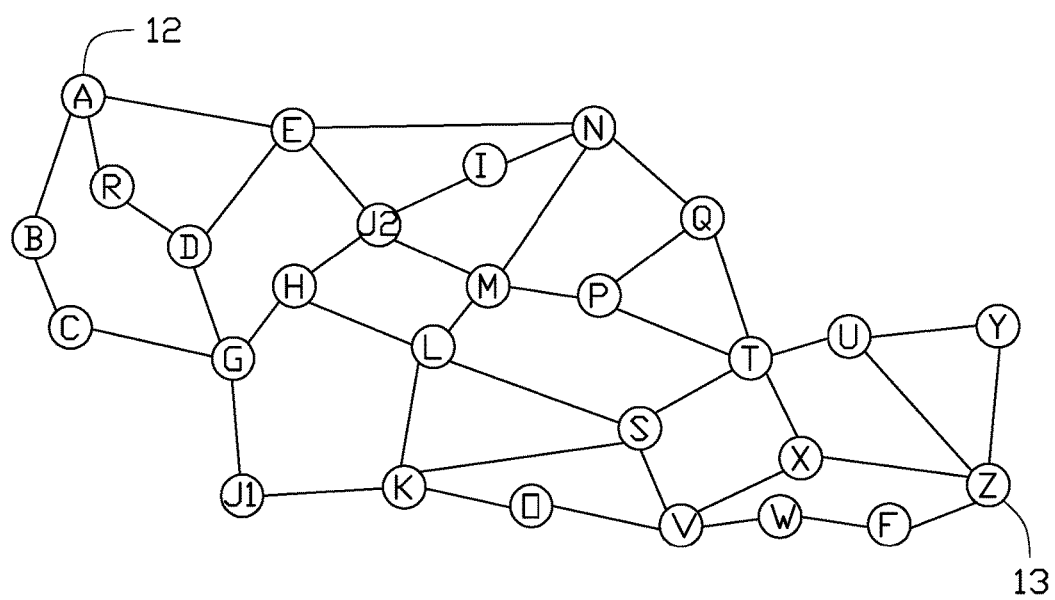
FIG. 3 is an exemplary embodiment of a network topology established by the virtual machine migration device.

FIG. 3 illustrates the network topology. The first server 12 is shown as a node A, the second server 13 is shown as node Z. Other servers are shown as nodes B to Y. According to FIG. 3, the virtual machine 11 is migrated from the first server 12 to the second server 13 through multiple middle servers. The virtual machine migration device 100 can select one or more feasible migration paths to migrate the virtual machine 11.

The calculation module 3 determines whether a transmission time between two adjacent nodes is greater than the service timeout time. When the transmission time between two adjacent nodes is greater than the service timeout time, the calculation module 3 deletes a target node from its calculation. The calculation module 3 further deletes redundant nodes in the network topology.

For example, transmission time between the node A and the node B is greater than the service timeout time. When the virtual machine 11 is migrated from the node A to the node B, the application downtime will be noticeable. The calculation module 3 thus deletes node B from the network topology. When the node B is deleted, node C becomes a redundant node, and the calculation module 3 also deletes node C from the network topology.

Figure 4:
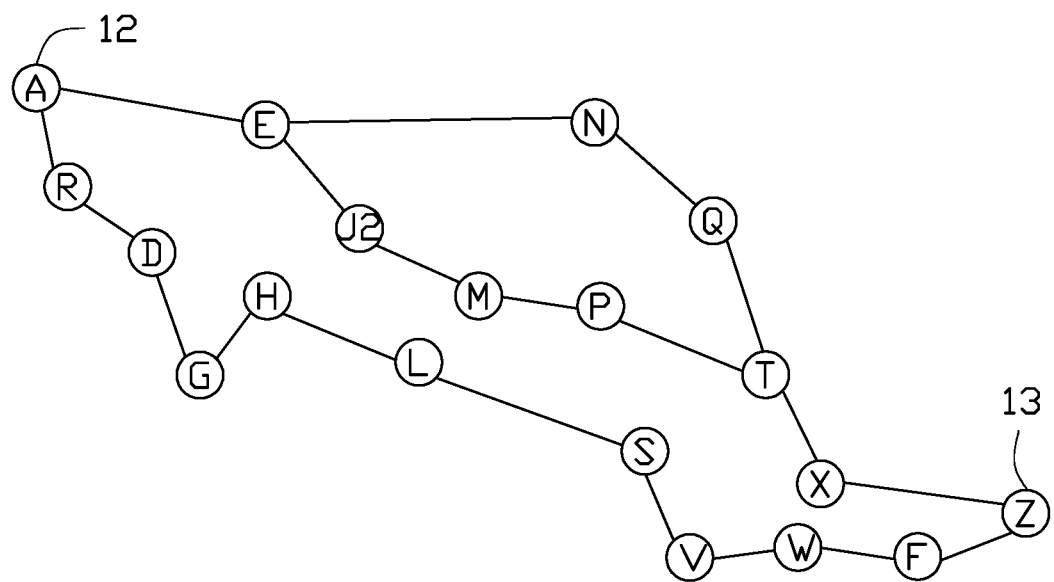
FIG. 4 is a simplified network topology of the topology of FIG. 3.

FIG. 4 illustrates a simplified network topology. According to FIG. 4, the simplified network topology comprises three feasible migration paths. A first feasible migration path is A-R-D-G-H-L-S-V-W-F-Z, a second feasible migration path is A-E-J2-M-P-T-X-Z, and a third feasible migration path is A-E-N-Q-T-X-Z. The calculation module 3 calculates the number of intermediate nodes along each of the three feasible migration paths.

For example, the number of intermediate nodes of the first feasible migration path is two, the number of intermediate nodes of the second feasible migration path is three, and the number of intermediate nodes of the third feasible migration path is four. The calculation module 3 selects the first feasible migration path as the migration path to migrate the virtual machine 11.

The following will use the first feasible migration path as an exemplary embodiment in describing a principle of the minimum hop path algorithm.

For example, the service timeout time is 15 seconds. Transmission time between the node A and the node R is 1 second, a run up time of the node R is 2 seconds. A transmission time between the node R and the node D is 6 seconds, a run up time of the node D is 3 seconds. A transmission time between the node D and the node G is 5 seconds, a run up time of the node G is 2 seconds. A transmission time between the node G and the node H is 4 seconds, a run up time of the node H is 1 second. A transmission time between the node H and the node L is 7 seconds, a run up time of the node L is 3 seconds. A transmission time between the node L and the node S is 1 second, a run up time of the node S is 1 second. A transmission time between the node V and the node W is 6 seconds, a run up time of the node W is 2 seconds. A transmission time between the node W and the node F is 3 seconds, a run up time of the node F is 3 seconds. A transmission time between the node F and the node Z is 1 second, a run up time of the node Z is 1 second. A transmission time between the node S and the node V is 1 second, and a run up time of the node V is 3 seconds.

A migration time from the node A to the node G is equal to a sum of transmission time between the node A and the node G (12 seconds) and the run up time of the node G (2 seconds). This means that the migration time from the node A to the node G is 14 seconds.

The calculation module 3 selects a node with the slowest speed from the first feasible migration path as a search origin. In the first feasible migration path, the transmission time between the node H and the node L is the longest (7 seconds). Therefore, the calculation module 3 selects the node L as the search origin.

The calculation module 3 extends the node L to the left to search for a first longest node. A migration time from the node L to the node G is found to be 13 seconds, and a migration time from the node L to the node D is found to be 19 seconds. The migration time from the node L to the node D is greater than the service timeout time. The first longest node to the left is the node G. The calculation module 3 extends the node G to the right to search for a second longest node. Migration time from the node G to the node S is found to be 13 seconds, and a migration time from the node G to the node V is found to be 16 seconds. The migration time from the node G to the node V is greater than the service timeout time. The second longest node is the node S. The calculation module 3 searching for a longest segment finds it is the node G to the node S.

The calculation module 3 divides the first feasible migration path to generate two sub paths according to the longest segment. A first sub path is A-R-D-G, and a second sub path is S-V-W-F-Z. The calculation module 3 repeats processing the two sub paths to search for longest segments according to the principle as above. After processing, it is found that neither of the two sub paths comprise the longest segment.

When the virtual machine 11 is migrated from the node A to the node Z according to the first feasible migration path, the first feasible migration path comprises A-G-S-Z. The node G and the node S are the intermediate nodes.

Figure 5:
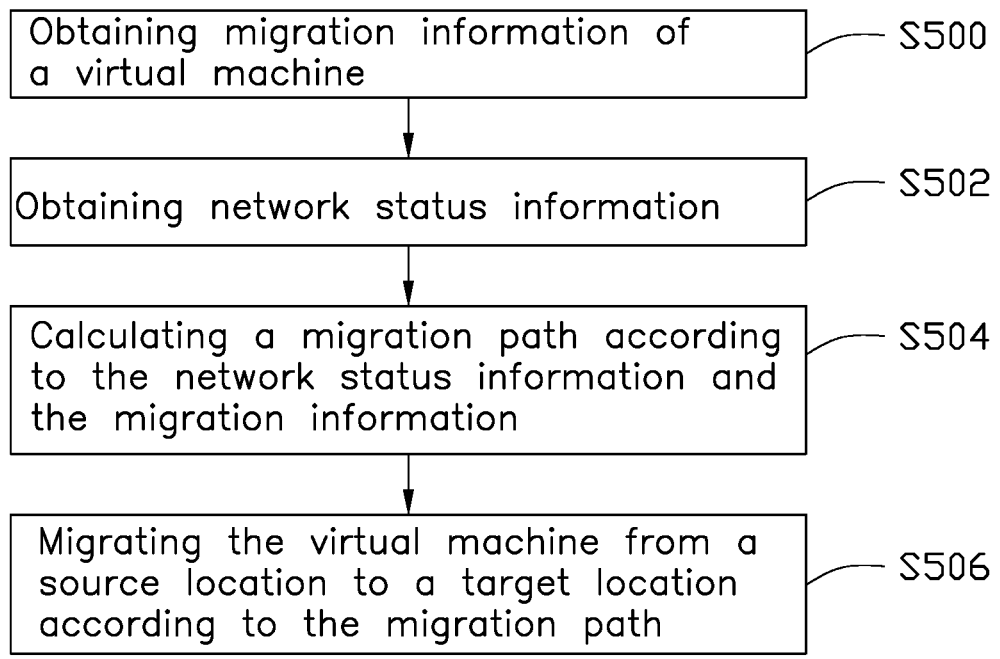
FIG. 5 is a flow diagram of an exemplary embodiment of a virtual machine migration method.

FIG. 5 illustrates an exemplary embodiment of a virtual machine migration method. The flowchart presents an example exemplary embodiment of the method. The example method is provided by way of example, as there are a variety of ways to carry out the method. The method described below can be carried out using the configurations illustrated in FIG. 2, for example, and various elements of these figures are referenced in explaining the example method. Each step shown in FIG. 5 represents one or more processes, methods, or subroutines, carried out in the example method. Furthermore, the illustrated order of steps is illustrative only and the order of the steps can change. Additional steps can be added or fewer steps may be utilized without departing from this disclosure. The example method can begin at step S500.

In step S500, the first obtaining module 1 obtains the migration information of the virtual machine 11. The migration information can comprise the first server information, the second server information, and the service timeout time.

In step S502, the second obtaining module 2 obtains the network status information.

In step S504, the calculation module 3 calculates the migration path according to the network status information and the migration information.

In step S506, the migration module 4 migrates the virtual machine 11 from the source location to the target location according to the migration path.

In one exemplary embodiment, the second obtaining module 2 further determines whether the network status information is changed. When the network status information is changed, the calculation module 3 recalculates the migration path, and the migration module 4 migrates the virtual machine 11 to the target location according to the recalculated migration path.

In one exemplary embodiment, the calculation module 3 further establishes the network topology according to the network status information and the migration information, and simplifies the network topology so as to be within the service timeout time. The calculation module 3 obtains one or more feasible migration paths according to the simplified network topology and calculates the number of intermediate nodes of each of the feasible migration paths according to the minimum hop path algorithm. Then, the calculation module 3 can select the feasible migration path with the minimum number of intermediate nodes as the migration path to migrate the virtual machine 11.

The exemplary embodiments shown and described above are only examples. Many such details are neither shown nor described. Even though numerous characteristics and advantages of the present technology have been set forth in the foregoing description, together with details of the structure and function of the present disclosure, the disclosure is illustrative only, and changes may be made in the detail, including in matters of shape, size, and arrangement of the parts within the principles of the present disclosure, up to and including the full extent established by the broad general meaning of the terms used in the claims. It will therefore be appreciated that the exemplary embodiments described above may be modified within the scope of the claims.

What is claimed is:

1. A virtual machine migration method comprising:
    obtaining network status information and migration information of a virtual machine;
    calculating a migration path according to the network status information and the migration information; and
    migrating the virtual machine from a source location to a target location according to the migration path;
    wherein calculating a migration path according to the network status information and the migration information comprises:
    establishing a network topology according to the network status information and the migration information;
    simplifying the network topology according to the service timeout time;
    obtaining one or more feasible migration paths according to a simplified network topology; and
    calculating a number of intermediate nodes of each of the feasible migration path according to a minimum hop path algorithm, and selecting a feasible migration path with minimum intermediate nodes as the migration path to migrate the virtual machine;
    wherein calculating a number of intermediate nodes of each of the feasible migration path according to a minimum hop path algorithm comprises:
    obtaining the feasible migration path and selecting a slowest speed node from the feasible migration path as a search origin;
    extending the search origin to the left and the right to search a longest segment;
    dividing the feasible migration path to generate two sub paths according to the longest segment;
    repeating processing the two sub paths to search for the longest segment; and
    calculating the number of intermediate nodes of the feasible migration path according to searched longest segments.

2. The virtual machine migration method of claim 1, wherein the source location is a first server, and the target location is a second server different from the first server.

3. The virtual machine migration method of claim 1, further comprising:
    determining whether the network status information is changed; and
    recalculating the migration path in response to the network status information being changed.

4. The virtual machine migration method of claim 3, further comprising:
    migrating the virtual machine according to a recalculated migration path.

5. The virtual machine migration method of claim 1, wherein the migration information comprises the source location, the target location, and a service timeout time.

6. A virtual machine migration device, comprising:
    at least one storage, configured to store a plurality of modules, which is a collection of instructions of an application run in the device;
    at least one processor, configured to execute the plurality of modules, the modules comprising:
    a first obtaining module, configured to obtain migration information of a virtual machine;
    a second obtaining module, configured to obtain network status information;
    a calculation module, configured to calculate a migration path according to the network status information and the migration information; and
    a migration module, configured to migrate the virtual machine from a source location to a target location according to the migration path;
    wherein the calculation module is further configured to establish a network topology according to the network status information and the migration information, and simplify the network topology; the calculation module is further configured to obtain one or more feasible migration paths according to a simplified network topology and calculate a number of intermediate nodes of each of the feasible migration path according to a minimum hop path algorithm, to select a feasible migration path with minimum intermediate nodes as the migration path to migrate the virtual machine;
    wherein the calculation module selects a slowest speed node from the feasible migration path as a search origin and extends the search origin to the left and the right to search a longest segment, the calculation module further divides the feasible migration path to generate two sub paths according to the longest segment and repeats processing the two sub paths to search for the longest segment, and calculates the number of intermediate nodes of the feasible migration path according to searched longest segments.

7. The virtual machine migration device of claim 6, wherein the source location is a first server, and the target location is a second server different from the first server.

8. The virtual machine migration device of claim 6, wherein the second obtaining module is further configured to determine whether the network status information is changed; the calculation module is further configured to recalculate the migration path in response to the network status information being changed; and the migration module is further configured to migrate the virtual machine to the target location according to a recalculated migration path.

9. The virtual machine migration device of claim 6, wherein the migration information comprises the source location, the target location, and a service timeout time.

10. The virtual machine migration device of claim 6, wherein the calculation module is further configured to simplify the network topology according to the service timeout time.

* * * * *